United States Patent [19]

Baker et al.

[11] 4,176,209

[45] Nov. 27, 1979

[54] PROCESS FOR FORMING POLYMERIC PARAXYLYLENE COATINGS AND FILMS POSSESSING IMPROVED OXIDATION RESISTANCE

[75] Inventors: Thomas E. Baker, Northboro; George L. Fix, Grafton; John S. Judge, Lexington, all of Mass.

[73] Assignee: Raytheon Corporation, Lexington, Mass.

[21] Appl. No.: 868,159

[22] Filed: Jan. 9, 1978

[51] Int. Cl.² .................. C23C 11/00; C23C 13/00

[52] U.S. Cl. .................. 427/248 B; 427/248 G; 427/248 H

[58] Field of Search ............ 427/248 H, 248 B, 248 G

*Primary Examiner*—Bernard D. Pianalto
*Attorney, Agent, or Firm*—Joseph D. Pannone; David E. Brook

[57] ABSTRACT

Polymeric paraxylylene coatings and films possessing significantly improved oxidation resistance, particularly at elevated temperatures, are disclosed as well as a process for their preparation wherein certain antioxidants are vaporized and codeposited with vaporous poly(paraxylylene) precursors onto a substrate.

10 Claims, 2 Drawing Figures

PROCESS FOR FORMING POLYMERIC PARAXYLYLENE COATINGS AND FILMS POSSESSING IMPROVED OXIDATION RESISTANCE

BACKGROUND OF THE INVENTION

1. Field of the Invention

This invention is in the field of coatings and films formed from polymeric paraxylylene.

2. Description of the Prior Art

One of the earliest methods disclosed for the preparation of polymeric paraxylylene coatings is that of Szwarc which consists of a high temperature pyrolysis of paraxylene at 800°–1000° C. and subatmospheric pressures followed by cooling the pyrolysis vapors to a polymerization temperature by condensing the vapors on a cold surface. Szwarc, M., "The C—H Bond Energy in Toluene and Xylenes", *J. Chem. Phys.*, 16, No. 2, pp 126–136 (1948). Upon cooling and condensation, the reactive diradicals formed in the Szwarc process polymerized and formed a polymeric coating on the cool surface.

An alternative method for the preparation of such coatings has been attempted by Schaefgen using related compounds, such as cyclic di-paraxylylene and linear di-paraxylylene, which were pyrolyzed in an attempt to secure the polymeric paraxylylenes free of crosslinking. Schaefgen, *J. Poly. Sci.*, 15, pp 203–219 (1955).

More recently, there has been renewed interest in polymeric paraxylylene coatings and films and much effort has been directed to finding new and better ways to produce these. Many of the newer techniques have been described in the patent literature. For example, the preparation of cyclic di-paraxylylene, which is the starting dimer employed in the more recent work, is described in U.S. Pat. No. 3,149,175 issued to Pollart.

U.S. Pat. No. 3,342,754, issued to Gorham, discloses a method for forming paraxylylene homopolymers by pyrolyzing cyclic di-paraxylylene dimer and subsequently condensing the diradicals formed in pyrolysis; U.S. Pat. No. 3,223,728, also issued to Gorham, discloses a similar method for producing copolymers from substituted cyclic di-paraxylylenes. U.S. Pat. No. 3,472,795, issued to Tittman et al., discloses an improvement in these processes which is the use of a predeposition cooling zone prior to condensation and polymerization to remove the less volatile constituents in the pyrolysis vapors and thereby provide polymer films of higher purity and more uniform thickness.

Improvements relating to the application of polymeric paraxylylene films to substrates are also disclosed in the patent literature. In U.S. Pat. No. 3,600,216, issued to Stewart, for example, the improvement of using an ethylenically unsaturated silicon compound with at least one hydrolyzable or condensable group to improve adhesion of polymeric paraxylylene films to solid substrates is disclosed. Similarly, an improved masking process for use in the vapor deposition of a linear polymeric paraxylylene coating onto a substrate is described in U.S. Pat. No. 3,895,135 issued to Hoffer.

As a result of the more recent work, polymeric paraxylylene coatings can now be formed which are tough, strong, and exhibit an unusual combination of electrical, physical and thermal properties. Because of these properties, polymeric paraxylylene coatings have come into wide use, particularly as conformal coatings for electronic assemblies. Despite their many outstanding properties, however, polymeric paraxylylene coatings and films have heretofore suffered from very poor oxidation resistance, particularly at elevated temperatures.

This problem has long been recognized, of course, and many attempts have been made to solve it. However, conventional solutions, such as incorporating an antioxidant with the polymer prior to molding, are not possible with polymeric paraxylylene films since these are non-processable organic coatings formed by condensation of vaporous species, usually under vacuum conditions. Because of this, non-conventional solutions have been sought.

One solution which has been proposed is that disclosed in U.S. Pat. No. 3,503,903 issued to Shaw et al. In this method, the performance capabilities of polymeric paraxylylene films are improved by terminating residual radicals in freshly deposited polymers by reacting these radicals with radicals having much more rapid reactivity with paraxylylene radicals than oxygen for a sufficient time to cause the electron spin resonance spectrum of the polymer to disappear. It is suggested in this patent that the polymers can be either heat terminated directly or dissimilar radicals can be generated in situ. These techniques have not found wide acceptance, however, probably because of the difficulty of implementation.

Thus, although the problem of poor oxidation resistance for polymeric paraxylylene coatings and films has been long recognized, a suitable solution has not yet been developed. This point can be illustrated by noting that the maximum service temperature of a parylene "C" coating for approximately 1000 hours of service life in an oxygen-containing atmosphere, such as air, is about 115° C., whereas its maximum service temperature for the same period in vacuum is about 265° C. Parylene "C" is a polymerized paraxylylene widely used to form conformal coatings on electrical components and is formed by the pyrolytic cleavage and subsequent condensation of the dichloro-substitute cyclic paraxylylene dimer. Clearly then, there is still a severe problem with the oxidation resistance of polymeric paraxylylene coatings and films of the type presently commercially used.

SUMMARY OF THE INVENTION

This invention relates to the incorporation of certain antioxidants into polymeric paraxylylene coatings and films. As previously mentioned, the incorporation of antioxidants into these has heretofore been impossible or extremely difficult because of the way in which such coatings and films are formed.

According to the method described herein, a suitable antioxidant material is first vaporized and subsequently codeposited with vaporous polymeric paraxylylene precursor onto the substrate to be coated. Thus, an antioxidant is incorporated into the coating as the polymer forms on the substrate. Codeposition can be accomplished by two alternative methods.

In one method, referred to herein as the covaporization technique, an antioxidant having suitable physical and chemical properties can be blended with the starting precursor material and charged directly into the vaporizer of a chemical vapor deposition apparatus suitable for forming polymeric paraxylylene coatings. In this case, the antioxidant must have a vapor pressure equal to or less than the precursor material at the precursor vaporization temperature so that it will vaporize within the temperature range at which the polymeric paraxylylene precursor vaporizes. It must also be vapor-transportable to the point of condensation without deleterious chemical change.

The other method involves the principle of dual vaporization. In this technique, an antioxidant is charged into a separate vaporizer from the one used to vaporize polymeric paraxylylene precursor and is introduced into the deposition chamber via an alternative vaporization tube. The strict antioxidant vapor pressure limitations are not present when dual vaporization is employed. Also, the concentration of antioxidant within the deposited paraxylylene polymer can be varied by varying the rate of vaporization of antioxidant while maintaining the precursor vaporization rate constant.

The resultant films contain antioxidant which can be uniformly incorporated, or incorporated with a concentration gradient. It may be, for example, that it is advantageous to provide a higher concentration of antioxidant at the film surface where most of the oxidation would be expected to initiate.

Coatings produced by the methods described herein have been found to possess significantly improved oxidation resistance, particularly at elevated temperatures. Additionally, the improved oxidation resistance can be obtained without any concomitant loss of other critical film properties.

DESCRIPTION OF PREFERRED EMBODIMENTS

Figure 1:
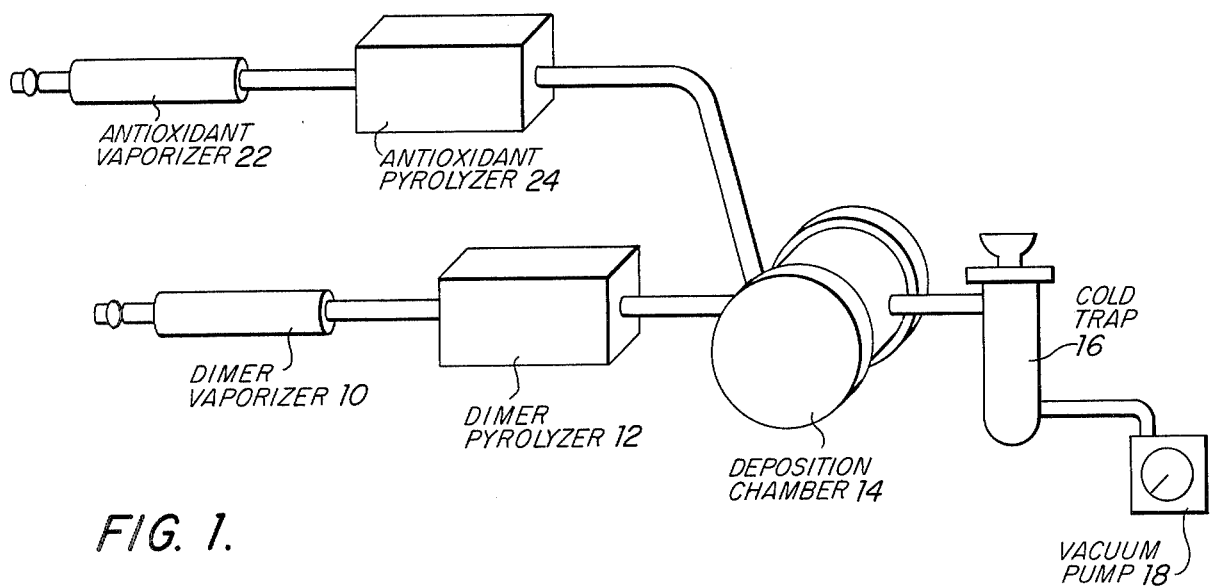
FIG. 1 is a schematic illustration of a chemical vapor deposition apparatus suitable for carrying out a codeposition process for preparing polymeric paraxylylene coatings according to this invention.

FIG. 1 is a schematic view of a chemical vapor deposition apparatus suitable for use in forming polymeric paraxylylene coatings using pyrolytic cleavage of cyclic paraxylylene dimers. Dimer is introduced into dimer vaporizer 10 and heated to a temperature sufficient to form vaporized dimer. Vaporized dimer is transported to dimer pyrolyzer 12 wherein dimer is pyrolytically cleaved to form vaporous paraxylylene diradicals. These diradicals are transported from pyrolyzer 12 into deposition chamber 14 which is maintained at a temperature below the condensation temperature of vaporous paraxylylene radicals. Substrates within deposition chamber 14 can be rotated as deposition and polymerization occur. This helps to insure uniform coatings on all substrate surfaces. Cold trap 16 is used to recover reactants escaping through deposition chamber 14, and vacuum pump 18 is used to provide vacuum throughout the system. Antioxidant vaporizer 22 is similar to dimer vaporizer 10 except that it is designed to hold and vaporize antioxidant material for the dual vaporization technique. Vaporizer 22 is not used, of course, in the co-vaporization technique. Antioxidant pyrolysis unit 24 can be used to pyrolyze antioxidant, and is optional, even when the dual vaporization method is used.

Appropriate operating conditions for an apparatus as illustrated in FIG. 1 are described in the patent literature referred to above. A specific set of operating parameters, which is suitable for depositing a coating formed from dichloro-diparaxylylene crystalline solid dimer, is as follows: dimer vaporizer, ~1 Torr, 165° C.; pyrolyzer, ~0.5 Torr, 710° C.; deposition chamber, ~0.1 Torr, 25° C.; cold trap, ~0.001 Torr, about −200° C. Of course, each of these values can be varied and these specific values are only given for purposes of illustration. A detailed study of the effect of varying vaporization and pyrolysis temperatures for this cyclic dimer is presented in Baker, T. E., Bagdasarian, S. L., Fix, G. L., and Judge, J. S., "Characterization of Vapor-Deposited Paraxylylene Coatings," *J. Electrochem. Soc.*, 24, No. 6, pp 897–900 (1977), the teachings of which are hereby incorporated by reference.

A variety of polymeric paraxylylene precursors can be used and generally include those materials which yield a vaporous paraxylylene diradical which can be condensed and simultaneously polymerized on a substrate. Some which are suitable have been described in the above-mentioned patent and technical literature, although others are probably suitable.

The preferred precursor materials are the cyclic paraxylylene dimers which have been extensively researched and are described in patents cited above. In general, these cyclic dimers have the following structural formula,

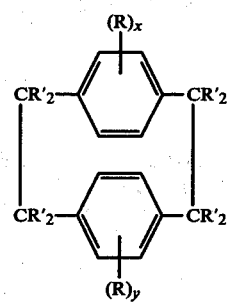

wherein R is a substituent on the aromatic ring, x and y are each integers from 0 to 3, inclusive, and R′ is H, Cl or F. Typical R groups include hydrogen, hydrocarbon, oxyhydrocarbon, thiohydrocarbon, hydroxyl, halogen, nitro, nitrile, amine and mercapto groups. After these cyclic dimers are pyrolized, they may be in the form of diradicals having the structures

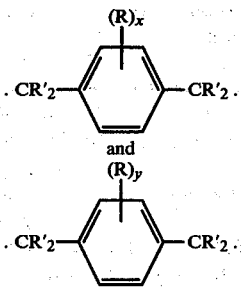

or moieties having the tetraene or quinoid structures represented by the formulas,

-continued
and

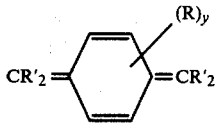

According to the patent literature, it may be that the tetraene or quinoid structure is the dominant structure which results when the cyclic dimer is pyrolyzed, but that the monomer polymerizes as though it were in the diradical form. As previously discussed, the preparation of these cyclic paraxylylene dimers and their pyrolytic cleavage and subsequent condensation to form copolymers and homopolymers is well known and described in the patent literature, particularly U.S. Pat. Nos. 3,149,175; 3,342,754; and 3,288,728, the teachings of which are hereby incorporated by reference.

Antioxidants are a generic class of materials which retard oxidation. Often, retardation is achieved in polymers by peroxide stabilization and/or free radical termination. A wide variety of antioxidants can be used in the process of this invention, as long as the physical and chemical requirements described are met.

In the co-vaporization method, antioxidants are mixed with polymeric paraxylylene precursor and introduced into the dimer vaporizer. These materials are vaporized simultaneously, pass through the pyrolysis unit, and are codeposited in the deposition chamber.

Antioxidants suitable for co-vaporization must vaporize within the range of temperatures at which the precursor material vaporizes, which requires that they have a vapor pressure equal to or less than that of the precursor at the precursor vaporization temperature. The vaporous species formed must be vapor transportable with out deleterious chemical changes, even in the pyrolyzer.

For dual vaporization, the antioxidant is vaporized separately from the polymer precursor. This allows the use of an antioxidant material which can be vaporized and is vapor-transportable without deleterious chemical changes.

Some specific examples of antioxidants which are suitable for use in this process are those represented by the following structural formulas,

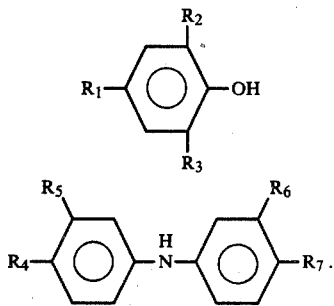

In these structural formulas, $R_1$–$R_7$ are individually selected from hydrogen, halogen, aliphatic or aromatic alkanes, alkenes, ethers, anhydrides or esters.

By appropriate selection of the $R_1$–$R_7$ substituents, the properties of a particular antioxidant, such as vapor pressure, peroxide stabilizing ability, reactivity with parylene monomer species, can be tailored. For example, a vinyl terminated aliphatic $R_1$–$R_7$ group would be expected to result in a copolymer species between the antioxidant and paraxylylene radicals.

Some specific antioxidants within these classes are as follows: 4,4'-methylene-bis(2,6-di-tert-butylphenol); N,N'-diphenyl-p-phenylenediamine; 2,6-di-tert-butyl-4-vinylphenol; N,N'-di-(3,4-phthalic anhydride)-p-phenylenediamine; 4,4'-isopropylidene-bis(2,6-diphenylphenol); N,N'-di-(4-styrene)-p-phenylenediamine; 4-methyl-2,6-di-tert-butylphenol; 4-ethoxy-2,6-di-tert-butylphenol; 4-(2,6-di-tert-butylphenol)propionate; 4,4'-dichlorodiphenylamine.

In some cases, it is believed that the antioxidant will simply be dispersed throughout the film by the codeposition technique described herein. In other cases, particularly where the antioxidant has a vinyl unsaturated end group, or a readily extractable H atom, the antioxidant appears to chemically react with groups on the polymer matrix or to form a copolymer with the paraxylylene radicals. In such cases, solvent extraction has shown that the antioxidant cannot be extracted to any significant degree.

The concentration of antioxidant can be made substantially uniform throughout the coating or film, or it can be varied. It might be advantageous, for example, to provide a highter concentration of antioxidant at the surface, where initiation of oxidative degradation would be expected to occur, than at the center portion.

Antioxidant concentration gradients can be created in the dual vaporation process by simply introducing vaporized antioxidant into the deposition chamber with a varying concentration while the concentration of the precursor material introduced is maintained constant. One method of doing this, of course, would be to raise the vaporization temperature of the antioxidant as it is desired to introduce a higher amount of antioxidant.

Concentration gradients can also be achieved with the co-vaporization technique. In a typical deposition of a polymeric paraxylylene coating, there is a unique pressure-time relationship. By using an appropriate amount of antioxidant with a vapor pressure lower than the precursor at normal processing conditions, a situation can be created where the ratio of precursor to antioxidant varies over the course of a deposition. The ratio of partial pressures of precursor and antioxidant would also be proportional to the ratio of antioxidant expected to be deposited in the coating.

The amount of antioxidant incorporated is that which is effective to produce a significant increase in oxidation resistance. Usually, the amount will be small. The minimum amount, of course, is that required to give a significant increase in oxidation resistance. On the other hand, any amount can be used up to that amount which results in significant destruction of other coating or film properties. Typically, amounts of 1% or less have been found satisfactory.

Polymeric paraxylylene coatings can be deposited upon a wide variety of substrates. Thus, the substrates can be organic or inorganic, and can be in any form or shape. Typical examples of substrates which can be coated are metals such as aluminum, iron, copper, steel, molybdenum, etc.; metal oxides such as aluminum oxide, titanium oxides, lead oxides, copper oxides, tantalum oxides, vanadium oxides, etc.; non-metal inorganic oxides such as silicon oxides; glass; solid organic materials such as epoxy containing compounds and thermoplastic and thermosetting polymers. Free films can be produced by depositing polymeric paraxylylene onto a non-adhesive substrate, such as one formed from polytetrafluoroethylene or polished metal, and subsequently separating the film and substrate.

The invention is further illustrated by the following Example.

EXAMPLE 1

CODEPOSITION OF 4, 4'-METHYLENE BIS (2, 6-DI-t-BUTYL PHENOL) AND DICHLORO-DIPARAXYLYLENE COATING WITH IMPROVED OXIDATION RESISTANCE

Polymeric paraxylylene coatings were formed on an electroless nickel substrate in a Union Carbide Model No. 10C coater which was similar to the apparatus illustrated in FIG. 1 except that there was no antioxidant vaporizer or pyrolyzer. The starting material was dichloro-diparaxylylene crystalline solid dimer obtained from Union Carbide Corp. This dimer produces a film generally referred to as parylene C.

In one run, 1% of an antioxidant, 4,4'-methylene-bis(2, 6-di-t-butyl phenol) was intimately mixed with 21.0 grams of dimer charge. In another run, 2% of the same antioxidant was intimately mixed with the dimer charge.

Vaporization of dimer and antioxidant was carried out with at a pressure of about 1 Torr and a temperature of 165° C.; pyrolysis was done at about 0.5 Torr and 710° C.; and the deposition chamber was maintained under a pressure of about 0.1 Torr and a temperature of about 25° C. The cold trap was maintained at about −200° C. and a pressure of about 0.001 Torr. Each run was continued for 2 hours and resulted in coatings which were approximately 15 microns.

Figure 2:
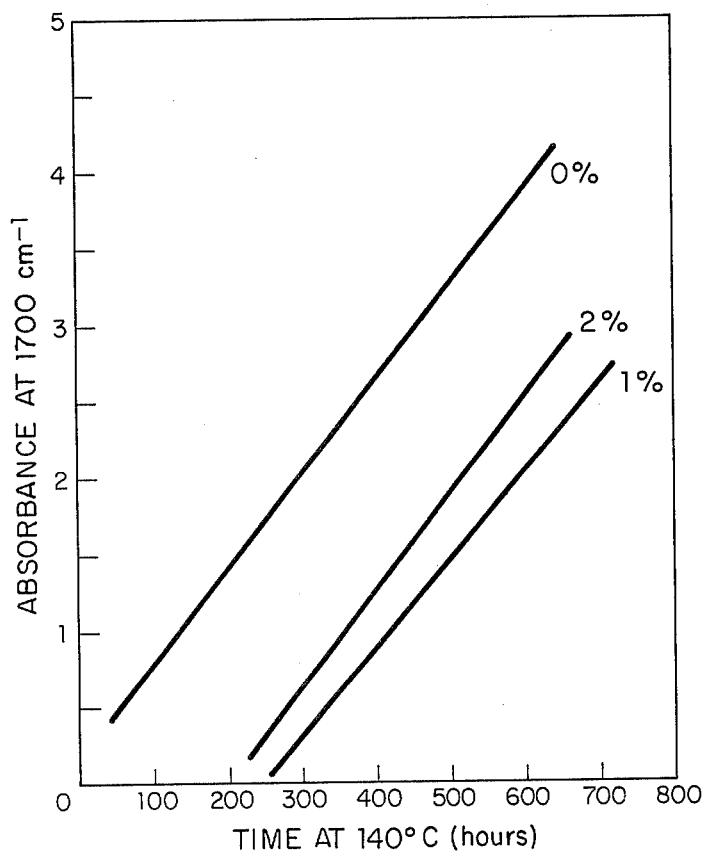
FIG. 2 is a plot of infrared spectroscopic data illustrating the improved oxidation resistance of coatings prepared according to this invention compared to a coating without an antioxidant therein when all were exposed to an oxygen-containing atmosphere at 140° C.

These coatings, as well as a conventional parylene C coating, were placed in forced air circulating ovens in an air atmosphere at 140°, 180°and 200° C. Oxidation analysis for each coating was monitored at intervals by infrared spectroscopy. In the technique used, the amount of oxygen incorporated into the polymer coating was detected from the intensity of the resultant organic acid infrared absorption peak at 1700 cm$^{-1}$. The results of the test at 140° C. are plotted in FIG. 2. As can be seen, there was a significant increase in oxidation resistance for both coatings which contained an antioxidant. The coating containing 1% shows better oxidation resistance than the ones containing 2% antioxidant, which is surprising. This does seem to indicate that there is an optimum concentration for each combination of antioxidant and polymeric paraxylylene coating which is achieved at relatively low levels of antioxidant.

Significant increases in oxidation resistance for coatings containing antioxidant were also noted at the more elevated temperatures when compared to parylene C controls.

Attempts to extract antioxidant were performed by Soxhlet extraction of a free film for four hours using tetrahydrofuran as a solvent. The soluble fraction was then analyzed by reverse phase liquid-liquid chromatography. Antioxidant was not detected in the soluble fraction which suggests that it was chemically bound to the polymer.

EXAMPLE 2

CODEPOSITION OF A TRIFUNCTIONAL STERICALLY HINDERED PHENOL (AGERITE GT) AND DICHLORO-DIPARAXYLYLENE COATING WITH IMPROVED OXIDATION RESISTANCE

Polymeric paraxylylene coatings were formed on an electroless nickle substrate in a Union Carbide Model No. 10C coater which was similar to the apparatus illustrated in FIG. 1 except that there was no antioxidant pyrolyzer.

The starting material was dichloro-diparaxylylene crystalline solid dimer obtained from Union Carbide Corp. This dimer produces a film generally referred to as parylene C. In one run 2.38 grams of an antioxidant, a trifunctional sterically hindered phenol (Agerite GT, Vanderbilt Rubber) was placed in the antioxidant vaporizer and 21.0 grams of the dimer was placed in the dimer vaporizer.

Vaporization of dimer was carried out at a pressure of about 1 Torr and a temperature of 165°; pyrolysis was done at about 0.5 Torr and 710° C.; and the deposition chamber was maintained under a pressure of about 0.1 Torr and a temperature of about 25° C. The cold trap was maintained at −200° C. and a pressure of about 0.001 Torr.

Vaporization of the antioxidant was initiated 90 minutes into the deposition run and was carried out with a pressure of about 1 Torr and a temperature of 250° C. The deposition run was continued for a total elapsed time of 2½ hours and resulted in coatings which were approximately 11 microns.

This coating, as well as a conventional parylene C coating, were placed in forced air circulating oven in an air atmosphere at 180° C. Oxidation analysis for each coating was monitored at intervals by infrared spectroscopy.

The oxidation resistance of antioxidant containing coating, formed by the dual vaporization process, was found to be comparable to the 1% covaporization film of Example 1.

Those skilled in the art will recognize, or be able to determine using no more than routine experimentation, many equivalents to the specific embodiments described herein. Such equivalents are intended to be covered by the following claims.

What is claimed is:

1. In a chemical vapor deposition process for forming polymeric paraxylylene including the steps of producing vaporous polymeric paraxylylene precursor and subsequently condensing said precursor;

the improvement comprising condensing vaporized antioxidant simultaneously with said precursor, said antioxidant being a vaporizable and vapor-transportable material, to thereby incorporate said antioxidant into the polymeric paraxylylene formed.

2. The improvement of claim 1 wherein said vaporous polymeric paraxylylene precursor comprises vaporous paraxylylene diradicals produced by the pyrolytic cleavage of a cyclic paraxylylene dimer represented by the structural formula,

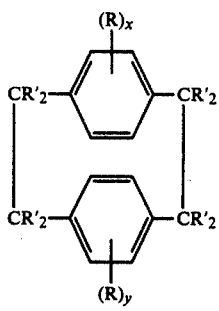

wherein R is an aromatic ring substituent, x and y are each integers from 0 to 3, inclusive, and R' is H, Cl or F.

3. The improvement of claim 2 wherein said vaporous paraxylylene diradicals comprise paraxylylene.

4. The improvement of claim 2 wherein said vaporous paraxylylene diradicals comprise monochloroparaxylylene diradicals.

5. The improvement of claim 2 wherein said vaporous paraxylylene diradicals comprise dichloroparaxylylene diradicals.

6. The improvement of claim 2 wherein said vaporous cyclic paraxylylene dimer and said vaporized antioxidant are combined in a single vapor stream, said antioxidant being vaporizable within the range of temperatures at which said precursor material vaporizes to produce a vaporized antioxidant which is vapor-transportable.

7. The improvement of claim 2 wherein said vaporous cyclic paraxylylene dimer and said vaporized antioxidant are maintained in separate vapor streams.

8. The improvement of claim 7 wherein the rate of condensation of said antioxidant is varied to provide an antioxidant concentration gradient in the polymeric paraxylylene formed.

9. The improvement of claim 8 wherein the rate of condensation of antioxidant is increased as the polymeric paraxylylene is formed to provide an increasing concentration of antioxidant toward the surface of said polymeric paraxylylene.

10. The improvement of claim 2 wherein said antioxidant is represented by a structural formula selected from $$\underset{R_3}{\underset{|}{R_1-\bigcirc-OH}}\overset{R_2}{^|}$$

and $$R_4-\underset{R_5}{\overset{|}{\bigcirc}}-\underset{H}{\overset{|}{N}}-\underset{}{\overset{R_6}{\overset{|}{\bigcirc}}}-R_7$$

wherein $R_1$–$R_7$ are individually selected from hydrogen, halogen, aliphatic or aromatic alkane, alkene, ether, and anhydride or ester.

* * * * *

UNITED STATES PATENT OFFICE
CERTIFICATE OF CORRECTION

Patent No. 4,176,209         Dated November 27, 1979

Inventor(s) Thomas E. Baker et al

It is certified that error appears in the above-identified patent and that said Letters Patent are hereby corrected as shown below:

Column 1, line 42: change "3,223,728" to --3,233,728--;

Column 7, line 44: change "$^{-1}$" to --$^{-1}$--.

Signed and Sealed this

Sixteenth Day of December 1980

[SEAL]

Attest:

SIDNEY A. DIAMOND

Attesting Officer        Commissioner of Patents and Trademarks